(12) United States Patent
Lund

(10) Patent No.: US 12,228,947 B2
(45) Date of Patent: Feb. 18, 2025

(54) MOBILE PLATFORM VISION SENSOR SYSTEMS AND METHODS

(71) Applicant: FLIR Unmanned Aerial Systems AS, Hvalstad (NO)

(72) Inventor: Jon Elvira Andres Lund, Hvalstad (NO)

(73) Assignee: FLIR UNMANNED AERIAL SYSTEMS AS, Hvalstad (NO)

( * ) Notice: Subject to any disclaimer, the term of this patent is extended or adjusted under 35 U.S.C. 154(b) by 351 days.

(21) Appl. No.: 17/825,910

(22) Filed: May 26, 2022

(65) Prior Publication Data

US 2022/0390965 A1 Dec. 8, 2022

Related U.S. Application Data

(60) Provisional application No. 63/196,135, filed on Jun. 2, 2021.

(51) Int. Cl.
*G05D 1/00* (2024.01)
*B64U 20/87* (2023.01)
(Continued)

(52) U.S. Cl.
CPC ............... *G05D 1/12* (2013.01); *B64U 20/87* (2023.01); *G05D 1/0094* (2013.01); *G05D 1/101* (2013.01); *H04N 23/682* (2023.01); *H04N 23/695* (2023.01); *B64U 10/13* (2023.01); *B64U 10/25* (2023.01); *B64U 2101/30* (2023.01); *B64U 2201/10* (2023.01)

(58) Field of Classification Search
CPC ........ G05D 1/12; G05D 1/0094; G05D 1/101; H04N 23/682; H04N 23/695; B64C 39/024
See application file for complete search history.

(56) References Cited

U.S. PATENT DOCUMENTS 9,851,046 B2 * 12/2017 Pan ................. F16M 11/18
10,054,946 B2 * 8/2018 Shin ................ B64C 39/024
(Continued)

OTHER PUBLICATIONS

Wikipedia, "Human Eye", Wikipedia The Free Encyclopedia, May 2022, 19 pages, Wikipedia, San Francisco, California, United States of America.
(Continued)

*Primary Examiner* — Hitesh Patel
*Assistant Examiner* — Luke Huynh
(74) *Attorney, Agent, or Firm* — Haynes and Boone, LLP

(57) ABSTRACT

Systems and methods related to operating a mobile platform are disclosed. In one embodiment, a logic circuit of a mobile platform may control a first gimbal system of the mobile platform to selectively direct a first variable navigation imaging system of the mobile platform to a first fixation point in an environment. The logic circuit may control a second gimbal system of the mobile platform to selectively direct a second variable navigation imaging system of the mobile platform to a second fixation point in the environment. The logic circuit may navigate the mobile platform about the environment, via a propulsion system of the mobile platform, based on image data associated with the first and second fixation points received from the first and second variable navigation imaging systems, respectively.

20 Claims, 6 Drawing Sheets

(51) Int. Cl.
*H04N 23/68* (2023.01)
*H04N 23/695* (2023.01)
*B64U 10/13* (2023.01)
*B64U 10/25* (2023.01)
*B64U 101/30* (2023.01)

(56) References Cited

U.S. PATENT DOCUMENTS

| | | |
|---|---|---|
| 2016/0171330 A1 | 6/2016 | Mentese et al. |
| 2017/0341776 A1 | 11/2017 | McClure et al. |
| 2019/0011921 A1* | 1/2019 | Wang ................... H04N 23/695 |
| 2020/0126239 A1* | 4/2020 | Qian ..................... G01S 3/7864 |

OTHER PUBLICATIONS

Wikipedia, "Chameleon Vision", Wikipedia The Free Encyclopedia, May 2022, 4 pages, Wikipedia, San Francisco, California, United States of America.

Wikipedia, "Arthropod Eye", Wikipedia The Free Encyclopedia, Mar. 2022, 7 pages, Wikipedia, San Francisco, California, United States of America.

* cited by examiner the benefit of U.S.
MOBILE PLATFORM VISION SENSOR SYSTEMS AND METHODS

CROSS REFERENCE TO RELATED APPLICATIONS

This application claims priority to and the benefit of U.S. Provisional Patent Application No. 63/196,135 filed Jun. 2, 2021 and entitled "MOBILE PLATFORM VISION SENSOR SYSTEMS AND METHODS," which is hereby incorporated by reference in its entirety.

TECHNICAL FIELD

One or more embodiments relate generally to mobile platforms and more particularly, for example, to mobile platform systems and methods for mobile platform navigation such as at high speeds, low altitudes, and/or in low-light conditions.

BACKGROUND

Modern unmanned mobile sensor platforms, such as unmanned aerial vehicles (UAVs), remotely operated underwater vehicles (ROVs), unmanned (water) surface vehicles (USVs), and unmanned ground vehicles (UGVs) are able to operate over long distances and in all environments; rural, urban, and even underwater. In particular, UAVs have a wide range of real-world applications including surveillance, reconnaissance, exploration, item transportation, disaster relief, aerial photography, large-scale agriculture monitoring, etc. A UAV may generally be equipped with various devices such as sensors and navigation technologies to complete a broad variety of operations in the real-world applications. However, oftentimes such sensors and navigation technologies may not be sufficient for aggressive maneuvers such as navigation at high speeds, low altitudes, and in low-light conditions. Thus, there is a need in the art for improvements to a UAV's ability to navigate.

SUMMARY

Various systems and methods related to operating a mobile platform are disclosed. In one embodiment, a mobile platform may include a propulsion system configured to provide a motive force for the mobile platform in navigation about an environment. The mobile platform may further include first and second variable navigation imaging systems and first and second gimbal systems. The first and second gimbal systems may be configured to selectively orient the first and second variable navigation imaging systems, respectively. The mobile platform may further include a logic circuit. The logic circuit may be configured to control the first gimbal system to selectively direct the first variable navigation imaging system to a first fixation point in the environment. The logic circuit may be configured to control the second gimbal system to selectively direct the second variable navigation imaging system to a second fixation point in the environment. The logic circuit may be further configured to navigate the mobile platform about the environment, via the propulsion system, based on first image data associated with the first fixation point and received from the first variable navigation imaging system and second image data associated with the second fixation point and received from the second variable navigation imaging system.

In another embodiment, a method for operating a mobile platform is provided. The method may include controlling, by a logic device of the mobile platform, a first gimbal system of the mobile platform to selectively direct a first variable navigation imaging system of the mobile platform to a first fixation point in an environment. The method may further include controlling, by the logic device of the mobile platform, a second gimbal system of the mobile platform to selectively direct a second variable navigation imaging system of the mobile platform to a second fixation point in the environment. The method may further include navigating, by the logic device, the mobile platform about the environment, via a propulsion system of the mobile platform, based on first image data associated with the first fixation point and received from the first variable navigation imaging system and second image data associated with the second fixation pint and received from the second variable navigation imaging system.

The scope of the invention is defined by the claims, which are incorporated into this section by reference. A more complete understanding of further embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
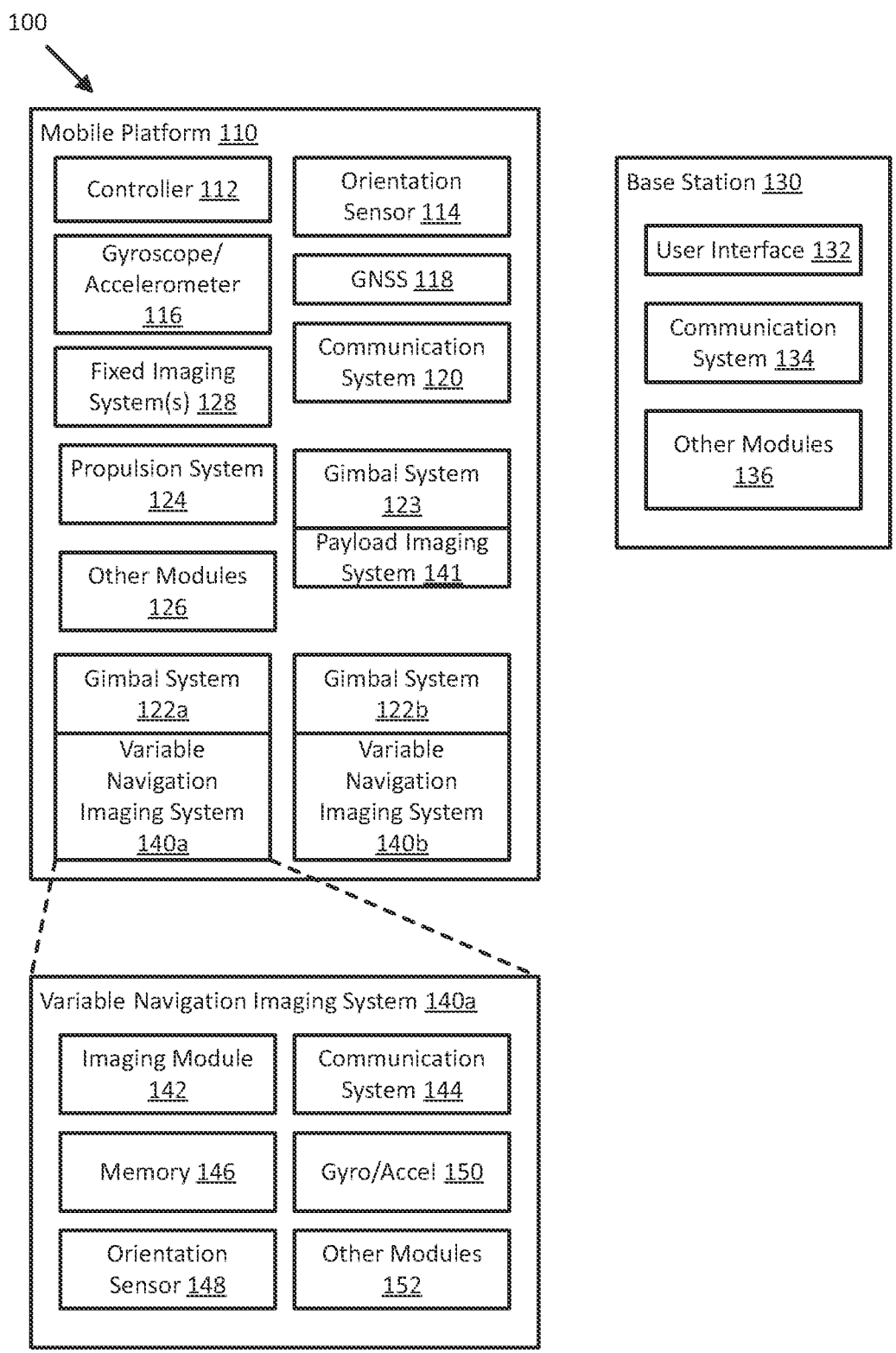
FIG. 1 illustrates a diagram of a survey system including a mobile platform and a base station in accordance with one or more embodiments of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Mobile platforms (e.g., UAVs, ROVs, USVs, and UGVs) participate in a number of different types of missions. In some missions, a UAV may be required to engage in aggressive navigation maneuvers at high speeds, low altitudes, and in low-light conditions. While some UAVs may use a gimbal to stabilize a payload camera for capturing high-definition video, fixed-body cameras are generally used for navigation purposes. However, conventional fixed-body cameras have limitations in relation to tracking aggressive UAV motion. Since body-fixed cameras are rigidly mounted, the image of the world can move quickly across the camera sensor. This introduces motion blur because of the significant optical flow during a sampling period. These problems are exacerbated during low-light conditions when pixel integration periods have to be increased to accumulate sufficient light. Thus, under aggressive maneuvers this becomes equivalent to only having a low-resolution image available. With only a low-resolution image available, stereo detection range is limited, meanwhile the size, weight, and power price of high-resolution stereo cameras are still incurred. Furthermore, details that are needed to spot obstacles at large distances, which are required to avoid collisions when moving fast, are lost.

The present disclosure provides systems, devices, and methods to facilitate operation of a mobile platform to solve the aforementioned problems. In one embodiment, two high-definition variable navigation imaging systems are mounted on separate gimbals of a mobile platform and used for adaptive foveal vision where points fixated on by the variable navigation imaging systems can be tracked with great acuity during aggressive maneuvers of the mobile platform. The variable navigation imaging systems may be controlled in a fixation-sacadding pattern where fixation points are tracked by the variable navigation imaging systems and used to navigate the mobile platform without collisions in both static and dynamic environments. In some embodiments, fixed-imaging systems, which may be implemented with low-resolution sensors to preserve power for the mobile platform, may be fixed to the mobile platform and may provide peripheral vision to supplement the foveal vision provided by the variable navigation imaging systems. Images provided by the fixed-imaging systems may be sampled at motion-dependent frame rates to reduce power consumption. Thus, there may be at least some vision in all direction while there is high visual acuity in the most interesting directions. Further embodiments and their advantages are discussed below.

Referring to FIG. 1, illustrated is a block diagram of a survey system 100 including a mobile platform 110 and a base station 130, in accordance with one or more embodiments of the disclosure. In various embodiments, mobile platform 110 may be configured to fly over a scene or survey area, to fly through a structure, or to approach a target and image or sense the scene, structure, or target, or portions thereof, using gimbal system 123 to aim payload imaging system 141 at the scene, structure, or target, or portions thereof, for example. Resulting imagery and/or other sensor data may be processed (e.g., by controller 112) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of mobile platform 110 and/or payload imaging system 141, such as controlling gimbal system 123 to aim payload imaging system 141 towards a particular direction, or controlling propulsion system 124 to move mobile platform 110 to a desired position in a scene or structure or relative to a target.

In the embodiment shown in FIG. 1, survey system 100 includes mobile platform 110, base station 130, variable navigation imaging systems 140a and 140b, and payload imaging system 141. Mobile platform 110 may be implemented as a mobile platform configured to move or fly and position and/or aim imaging system 141 (e.g., relative to a selected, designated, or detected target). As shown in FIG. 1, mobile platform 110 may include one or more of a controller 112, an orientation sensor 114, a gyroscope/accelerometer 116, a global navigation satellite system (GNSS) 118, a communication system 120, gimbal systems 122a and 122b, a gimbal system 123, a propulsion system 124, and other modules 126. Operation of mobile platform 110 may be substantially autonomous and/or partially or completely controlled by base station 130, which may include one or more of a user interface 132, a communication system 134, and other modules 136. In other embodiments, mobile platform 110 may include one or more of the elements of base station 130, such as with various types of manned aircraft, terrestrial vehicles, and/or surface or subsurface watercraft. Payload Imaging system 141 may be physically coupled to mobile platform 110 via gimbal system 123 and may be configured to capture sensor data (e.g., visible spectrum images, infrared images, narrow aperture radar data, and/or other sensor data) of a target position, area, and/or object(s) as selected and/or framed by operation of mobile platform 110 and/or base station 130.

Variable navigation imaging systems 140a and 140b may be respectively coupled to mobile platform 110 via gimbal systems 122a and 122b. Variable navigation imaging systems 140a and 140b may be directed by gimbal systems 122a and 122b to capture sensor data (e.g., visible spectrum images, infrared images, narrow aperture radar data, and/or other sensor data) of fixation points within an environment to facilitate operation of the mobile platform 110 in accordance with embodiments of the present disclosure. In some embodiments, variable navigation imaging systems 140a/140b may include a stereo vision system configured to provide image data that may be used to calculate or estimate a position of mobile platform 110, for example, or to calculate or estimate a relative position of a navigational hazard in proximity to mobile platform 110. In various embodiments, controller 112 may be configured to use such proximity and/or position information to help safely pilot mobile platform 110 as discussed herein.

In some embodiments, one or more of the elements of system 100 may be implemented in a combined housing or structure that can be coupled to or within mobile platform 110 and/or held or carried by a user of system 100.

Controller 112 may be implemented as any appropriate logic circuit and/or device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of mobile platform 110 and/or other elements of system 100, such as the gimbal systems 122a, 122b, and 123, variable navigation imaging systems 140a and 140b, payload imaging system 141, fixed imaging systems 128, or the propulsion system 124, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein.

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of mobile platform 110 such as gimbal systems 122a, 122b, and 123, variable navigation imaging systems 140a and 140b, payload imaging system 141, and fixed imaging system(s) 128, for example.

In some embodiments, controller 112 may be configured to substantially continuously monitor and/or store the status of and/or sensor data provided by one or more elements of mobile platform 110, gimbal systems 122a, 122b, 123, variable navigation imaging systems 140a, 140b, payload imaging system 141, fixed imaging system(s) 128, and/or base station 130, such as the position and/or orientation of mobile platform 110, gimbal systems 122a, 122b, 123, variable navigation imaging systems 140a, 140b, payload imaging system 141, and/or base station 130, for example.

Orientation sensor 114 may be implemented as one or more of a compass, float, accelerometer, and/or other device capable of measuring an orientation of mobile platform 110 (e.g., magnitude and direction of roll, pitch, and/or yaw, relative to one or more reference orientations such as gravity and/or Magnetic North), gimbal system 122a, 122b, 123, fixed imaging system(s) 128, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile platform 110 and/or other elements of system 100 and providing such measurements as sensor signals and/or data that may be communicated to other devices of system 100 (e.g., user interface 132, controller 112). GNSS 118 may be implemented according to any global navigation satellite system, including a GPS, GLONASS, and/or Galileo based receiver and/or other device capable of determining absolute and/or relative position of mobile platform 110 (e.g., or an element of mobile platform 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100 and other nodes participating in a mesh network. In some embodiments, GNSS 118 may include an altimeter, for example, or may be used to provide an absolute altitude.

Communication system 120 may be implemented as any wired and/or wireless communication system configured to transmit and receive analog and/or digital signals between elements of system 100 and other nodes participating in a mesh network. For example, communication system 120 may be configured to receive flight control signals and/or data from base station 130 and provide them to controller 112 and/or propulsion system 124. In other embodiments, communication system 120 may be configured to receive images and/or other sensor information (e.g., visible spectrum and/or infrared still images or video images) from variable navigation imaging systems 140a and 140b, fixed imaging system(s) 128, and/or payload imaging system 141 and relay the sensor data to controller 112 and/or base station 130. In some embodiments, communication system 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by communication system 120 may be configured to transmit data between elements of system 100 substantially continuously throughout operation of system 100, where such data includes various types of sensor data, control parameters, and/or other data, as described herein.

Gimbal systems 122a and 122b may be implemented as an actuated gimbal mount, for example, that may be controlled by controller 112 to stabilize variable navigation imaging systems 140a and 140b relative to a fixed position and/or target or to aim variable navigation imaging systems 140a and 140b according to a desired direction and/or relative orientation or position. For example, controller 112 may receive a control signal from one or more components of system 100 to cause gimbal system 122a or gimbal system 122b to adjust a position of variable navigation imaging systems 140a and 140b as described in the disclosure. As such, gimbal systems 122a and 122b may be configured to provide a relative orientation of variable navigation imaging system 140a or 140b (e.g., relative to an orientation of mobile platform 110) to controller 112 and/or communication system 120 (e.g., gimbal systems 122a and 122b may include their own orientation sensor 114). In various embodiments, gimbal systems 122a and 122b may be configured to provide power, support wired communications, and/or otherwise facilitate operation of articulated variable navigation imaging systems 140a and 140b. In further embodiments, gimbal systems 122a and 122b may be configured to couple to a laser pointer, range finder, and/or other device, for example, to support, stabilize, power, and/or aim multiple devices (e.g., variable navigation imaging systems 140a/140b and one or more other devices) substantially simultaneously.

In some embodiments, gimbal systems 122a/122b may be adapted to rotate variable navigation imaging systems 140a/140b+−90 degrees, or up to 360 degrees, in a vertical plane relative to an orientation and/or position of mobile platform 110. In further embodiments, gimbal system 122a/122b may rotate variable navigation imaging system 140a/140b to be parallel to a longitudinal axis or a lateral axis of mobile platform 110 as mobile platform 110 yaws, which may provide 360 degree ranging and/or imaging in a horizontal plane relative to mobile platform 110. In various embodiments, controller 112 may be configured to monitor an orientation of gimbal systems 122a/122b and/or variable navigation imaging systems 140a/140b relative to mobile platform 110, for example, or an absolute or relative orientation of an element of variable navigation imaging system 140 (e.g., imaging module 142). Such orientation data may be transmitted to other elements of system 100 for monitoring, storage, or further processing, as described herein.

Gimbal system 123 may be implemented as an actuated gimbal mount, for example, that may be controlled by controller 112 to stabilize and direct payload imaging system 141 relative to a target or to aim imaging system 141 according to a desired direction and/or relative orientation or position. For example, controller 112 may receive a control signal from one or more components of system 100 to cause gimbal system 123 to adjust a position of payload imaging system 141 as described in the disclosure. As such, gimbal system 123 may be configured to provide a relative orientation of payload imaging system 141 (e.g., relative to an orientation of mobile platform 110) to controller 112 and/or communication system 120 (e.g., gimbal system 123 may include its own orientation sensor 114). In other embodiments, gimbal system 123 may be implemented as a gravity driven mount (e.g., non-actuated). In various embodiments, gimbal system 123 may be configured to provide power, support wired communications, and/or otherwise facilitate operation of articulated sensor/payload imaging system 141. In further embodiments, gimbal system 123 may be configured to couple to a laser pointer, range finder, and/or other device, for example, to support, stabilize, power, and/or aim multiple devices (e.g., payload imaging system 141 and one or more other devices) substantially simultaneously.

In some embodiments, gimbal system 123 may be adapted to rotate payload imaging system 141 +−90 degrees, or up to 360 degrees, in a vertical plane relative to an orientation and/or position of mobile platform 110. In further embodiments, gimbal system 123 may rotate payload imaging system 141 to be parallel to a longitudinal axis or a lateral axis of mobile platform 110 as mobile platform 110 yaws, which may provide 360 degree ranging and/or imaging in a horizontal plane relative to mobile platform 110. In various embodiments, controller 112 may be configured to monitor an orientation of gimbal system 123 and/or payload imaging system 141 relative to mobile platform 110, for example, or an absolute or relative orientation of an element of payload imaging system 141 (e.g., a sensor of payload imaging system 141). Such orientation data may be transmitted to other elements of system 100 for monitoring, storage, or further processing, as described herein.

Propulsion system 124 may be implemented as one or more propellers, turbines, or other thrust-based propulsion systems, and/or other types of propulsion systems that can be used to provide motive force and/or lift to mobile platform 110 and/or to steer mobile platform 110. In some embodiments, propulsion system 124 may include multiple propellers (e.g., a tri, quad, hex, oct, or other type "copter") that can be controlled (e.g., by controller 112) to provide lift and motion for mobile platform 110 and to provide an orientation for mobile platform 110. In other embodiments, propulsion system 124 may be configured primarily to provide thrust while other structures of mobile platform 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Fixed imaging system(s) 128 may be implemented as an imaging device fixed to the body of mobile platform 110 such that a position and orientation is fixed relative to the body of the mobile platform, according in various embodiments. Fixed imaging system(2) may include one or more imaging modules, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, an imaging module of a fixed imaging system 128 may include one or more logic devices that can be configured to process imagery captured by detector elements of the imaging module before providing the imagery to controller 112. Fixed imaging system(s) 128 may be arranged on the mobile platform 110 and configured to perform any of the operations or methods described herein, at least in part, or in combination with controller 112 and/or user interface 132. An example fixed imaging system(s) 128 configuration includes using 6 fixed imaging systems, each covering a 90-degree sector to give complete 360-degree coverage. Using on-chip down-sampling of the images provided by fixed imaging system(s) 128 to approximately the order of 128×128 pixels and recording at 1200 Hz, the fixed imaging system(s) 128 can track rotations of 1000-1500 degrees per second with an optical flow of less than one pixel per frame. The same one-pixel optical flow per frame criteria would be fulfilled when flying mobile platform 110 at speeds in excess of 10 m/s at 1 m distance from the surface (e.g., wall, ground, roof, etc.). When not sampling at high rates, these low-resolution fixed imaging system(s) 128 should consume little power and thus minimally impact an average power consumption for mobile platform 110. Thus, a motion-dependent frame rate adjustment may be used to operate efficiently where the frame rate can be kept high enough to maintain the one pixel optical-flow per the frame tracking criteria.

Other modules 126 may include other and/or additional sensors, actuators, communications modules/nodes, and/or user interface devices, for example, and may be used to provide additional environmental information related to operation of mobile platform 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of mobile platform 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to mobile platform 110, where each actuated device includes one or more actuators adapted to adjust an orientation of the device, relative to mobile platform 110, in response to one or more control signals (e.g., provided by controller 112). In particular, other modules 126 may include a stereo vision system configured to provide image data that may be used to calculate or estimate a position of mobile platform 110, for example, or to calculate or estimate a relative position of a navigational hazard in proximity to mobile platform 110. In various embodiments, controller 112 may be configured to use such proximity and/or position information to help safely pilot mobile platform 110 and/or monitor communication link quality with the base station 130.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communication system 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In some embodiments, user interface 132 may be adapted to accept user input including a user-defined target heading, waypoint, route, and/or orientation for an element of system 100, for example, and to generate control signals to cause mobile platform 110 to move according to the target heading, route, and/or orientation, or to aim payload imaging system 141 or variable navigation imaging systems 140a and 140b accordingly. In other embodiments, user interface 132 may be adapted to accept user input modifying a control loop parameter of controller 112, for example. In further embodiments, user interface 132 may be adapted to accept user input including a user-defined target attitude, orientation, and/or position for an actuated or articulated device (e.g., payload imaging system 141) associated with mobile platform 110, for example, and to generate control signals for adjusting an orientation and/or position of the actuated device according to the target altitude, orientation, and/or position. Such control signals may be transmitted to controller 112 (e.g., using communication system 134 and 120), which may then control mobile platform 110 accordingly.

Communication system 134 may be implemented as any wired and/or wireless communication system configured to transmit and receive analog and/or digital signals between elements of system 100 and/or nodes participating in a mesh network. For example, communication system 134 may be configured to transmit flight control signals or commands from user interface 132 to communication systems 120 or 144. In other embodiments, communication system 134 may be configured to receive sensor data (e.g., visible spectrum and/or infrared still images or video images, or other sensor data) from imaging system 140. In some embodiments, communication system 134 may be configured to support spread spectrum transmissions, for example, and/or multiple simultaneous communications channels between elements of system 100. In various embodiments, communication system 134 may be configured to monitor the status of a communication link established between base station 130, imaging system 140, mobile platform 110, and/or the nodes participating in the mesh network (e.g., including packet loss of transmitted and received data between elements of system 100 or the nodes of the mesh network, such as with digital communication links). Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of mobile platform 110 and/or system 100 or to process sensor data to compensate for environmental conditions, such as water content in the atmosphere approximately at the same altitude and/or within the same area as mobile platform 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In embodiments where variable navigation imaging system 140a (and similarly variable navigation imaging system 140b) is implemented as an imaging device, variable navigation imaging system 140a may include an imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, imaging module 142 may include one or more logic devices that can be configured to process imagery captured by detector elements of imaging module 142 before providing the imagery to memory 146 or communication system 144. More generally, imaging module 142 may be configured to perform any of the operations or methods described herein, at least in part, or in combination with controller 112 and/or user interface 132. In some embodiments, the imaging module 142 may be a component of the controller 112.

In some embodiments, variable navigation imaging system 140a may be implemented with a second or additional imaging modules similar to imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communication system 144 of variable navigation imaging system 140a may be implemented as any wired and/or wireless communications module configured to transmit and receive analog and/or digital signals between elements of system 100. For example, communication system 144 may be configured to transmit infrared images from imaging module 142 to communication systems 120 or 134. In other embodiments, communication system 144 may be configured to receive control signals (e.g., control signals directing capture, focus, selective filtering, and/or other operation of variable navigation imaging system 140) from controller 112 and/or user interface 132. In some embodiments, communication system 144 may be configured to support spread spectrum transmissions, for example, and/or multiple simultaneous communications channels between elements of system 100. In various embodiments, communication system 144 may be configured to monitor and communicate the status of an orientation of the variable navigation imaging system 140a. Such status information may be used, for example, to adjust the orientation of the variable navigation imaging system 140a to capture images of fixed positions as discussed herein.

Memory 146 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. Memory 146 may also be implemented, at least in part, as removable memory, such as a secure digital memory card for example including an interface for such memory.

Orientation sensor 148 of variable navigation imaging system 140a may be implemented similar to orientation sensor 114 or gyroscope/accelerometer 116, and/or any other device capable of measuring an orientation of variable navigation imaging system 140a, imaging module 142, and/or other elements of variable navigation imaging system 140a (e.g., magnitude and direction of roll, pitch, and/or yaw, relative to one or more reference orientations such as gravity, Magnetic North, and/or an orientation of mobile platform 110) and providing such measurements as sensor signals that may be communicated to various devices of system 100. Gyroscope/accelerometer (e.g., angular motion sensor) 150 of variable navigation imaging system 140a may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of variable navigation imaging system 140a and/or various elements of variable navigation imaging system 140a and providing such measurements as sensor signals that may be communicated to various devices of system 100.

Other modules 152 of variable navigation imaging system 140 may include other and/or additional sensors, actuators, communications modules/nodes, cooled or uncooled optical filters, and/or user interface devices used to provide additional environmental information associated with variable navigation imaging system 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by imaging module 142 or other devices of system 100 (e.g., controller 112) to provide operational control of mobile platform 110 and/or system 100 or to process imagery to compensate for environmental conditions.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100. In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, Cursor-on-Target (CoT) or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices. In some embodiments, one or more of the devices may be powered by a power source for mobile platform 110, using one or more power leads. Such power leads may also be used to support one or more communication techniques between elements of system 100.

Figure 2:
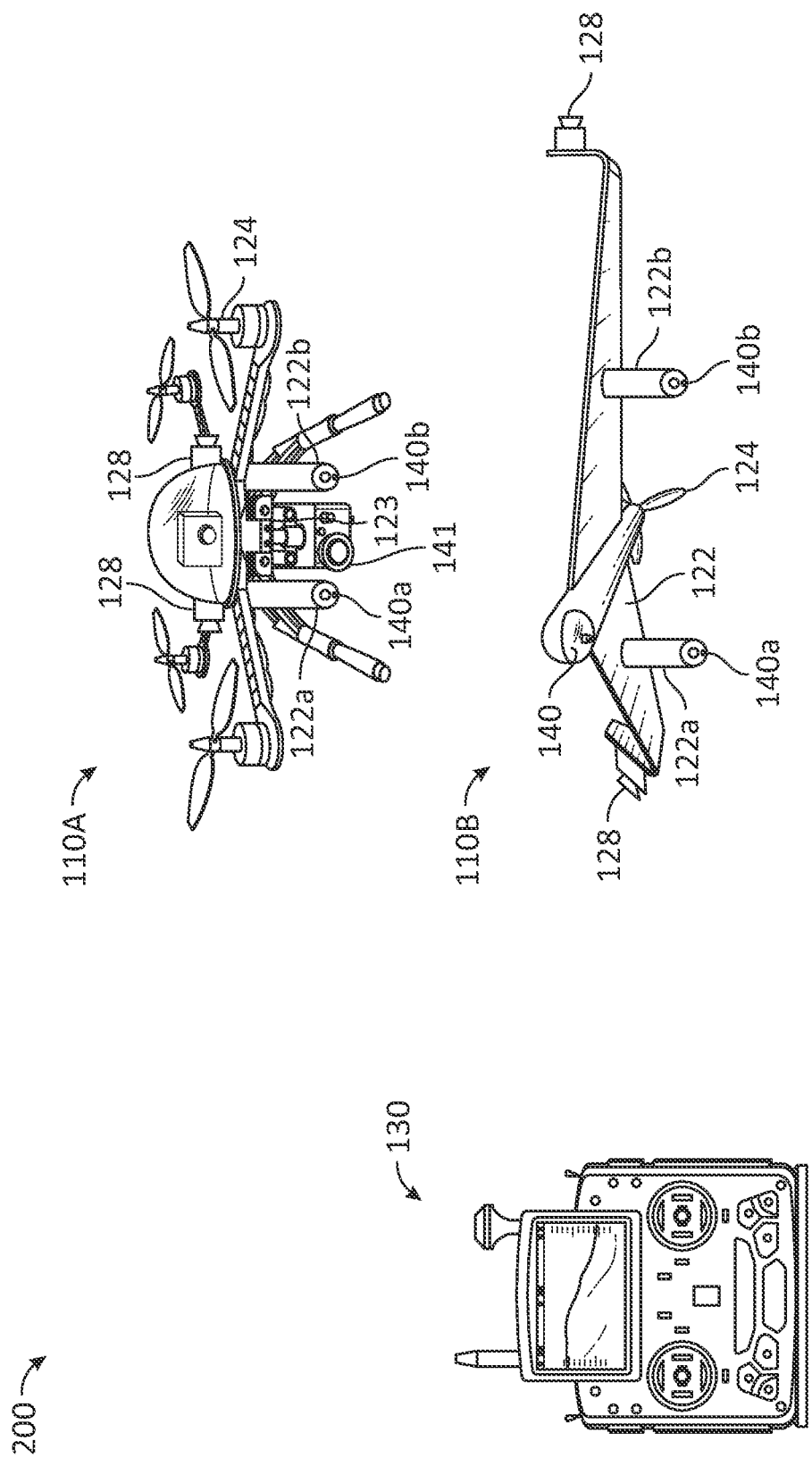
FIG. 2 illustrates a diagram of a survey system including mobile platforms and a base station in accordance with one or more embodiments of the disclosure.

FIG. 2 illustrates a diagram of survey system 200 including mobile platforms 110A and 110B, each with imaging systems 140 and associated gimbal systems 122 in accordance with an embodiment of the disclosure. In the embodiment shown in FIG. 2, survey system 200 includes base station 130; mobile platform 110A with gimbal systems 122a and 122b coupled to variable navigation imaging systems 140a and 140b, gimbal system 122 coupled to payload imaging system 141, and fixed imaging systems 128; and mobile platform 110B with gimbal systems 122a and 122b coupled to variable navigation imaging systems 140a and 140b, gimbal system 122 coupled to payload imaging system 141, and fixed imaging systems 128. In some embodiments, base station 130 may be configured to control motion, position, and/or orientation of mobile platform 110A, mobile platform 110B, and/or variable navigation imaging systems 140a and 140b or payload imaging system 141 (e.g., via their respective gimbal systems). More generally, survey system 200 may include any number of mobile platforms 110, 110A, and/or 110B.

Figure 3:
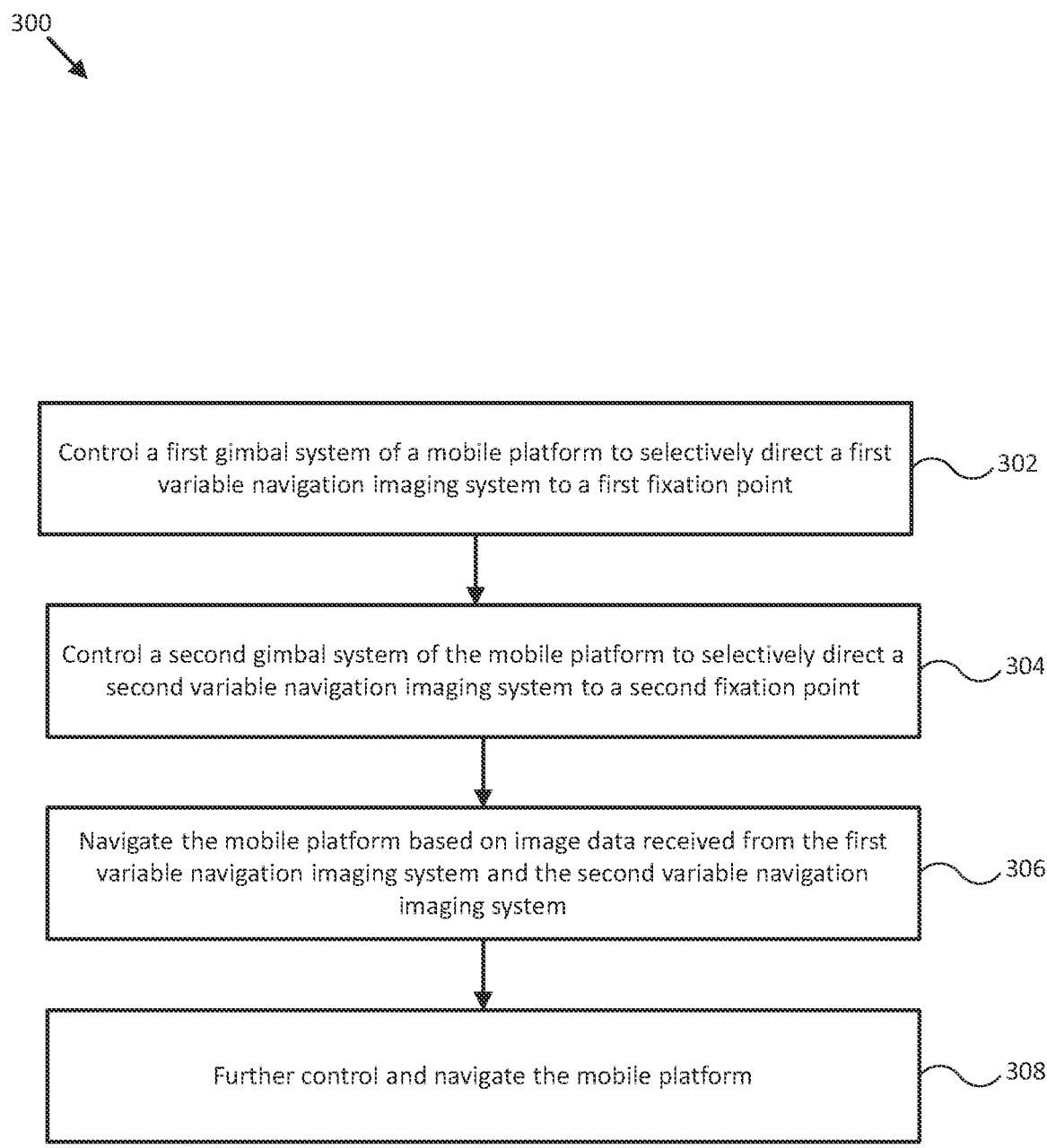
FIG. 3 illustrates a flow diagram of a process for operating a mobile platform in accordance with one or more embodiments of the disclosure.

FIG. 3 illustrates a flow diagram of a process 300 for operating mobile platform 110 in accordance with one or more embodiments of the disclosure. In some embodiments, process 300 of FIG. 3 may be implemented as software instructions executed by one or more logic circuits associated with corresponding electronic devices, sensors, and/or structures depicted in FIGS. 1-2 (e.g., controller 112). More generally, the operations of FIG. 3 may be implemented with any combination of software instructions, mechanical elements, and/or electronic hardware (e.g., inductors, capacitors, amplifiers, actuators, or other analog and/or digital components). It should also be appreciated that any step, sub-step, sub-process, or block of process 300 may be performed in an order or arrangement different from the embodiments illustrated by FIG. 3. For example, in some embodiments, one or more blocks may be omitted from or added to process 300. Furthermore, block inputs, block outputs, various sensor signals, sensor information, calibration parameters, and/or other operational parameters may be stored to one or more memories prior to moving to a following portion of a corresponding process. Note that in describing FIG. 3, reference is made to FIGS. 1-2 and 4A-4C, however, it will be appreciated that embodiments of FIG. 3 are not limited by FIGS. 1-2 and 4A-4C.

Figure 4A:
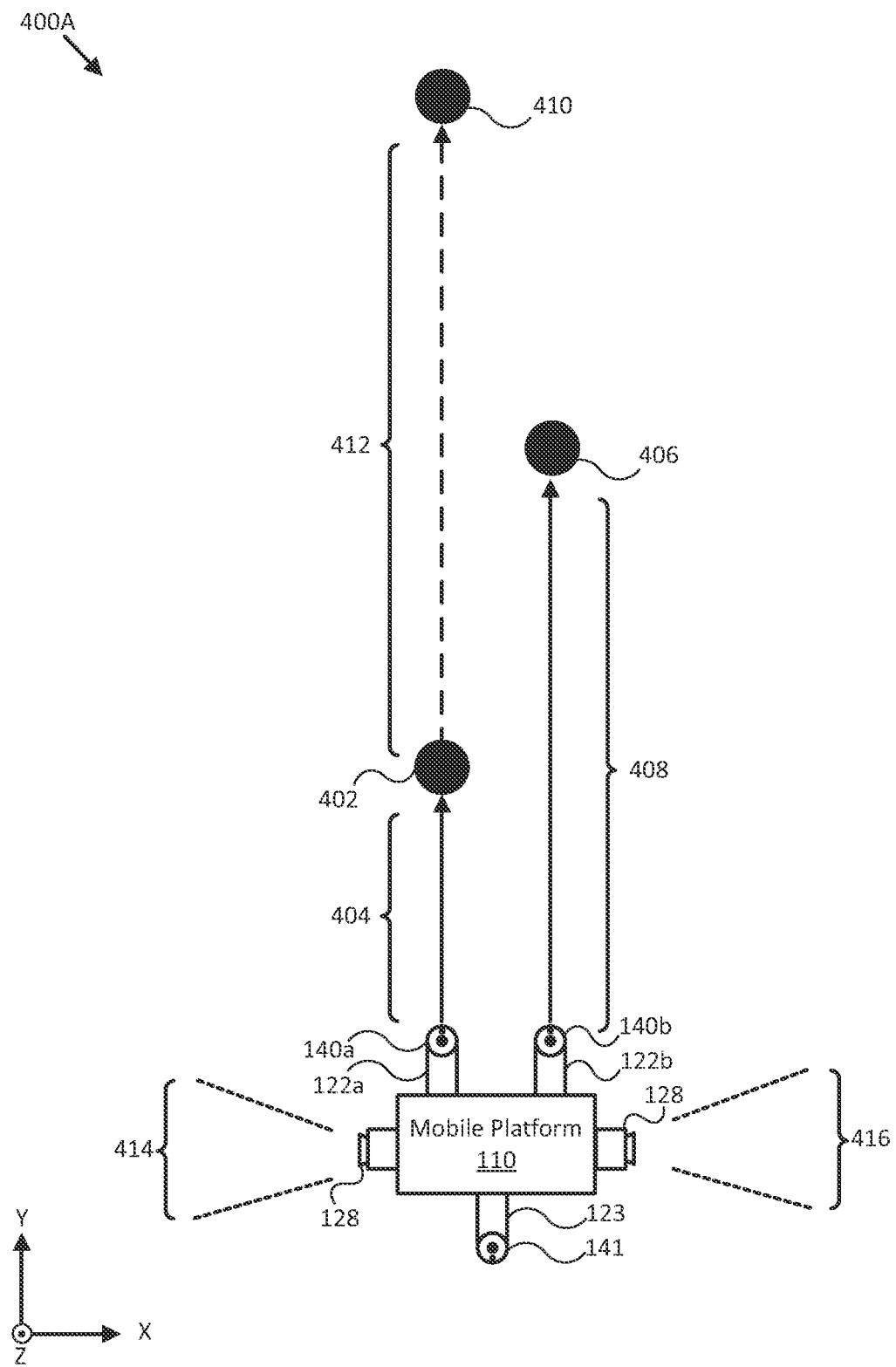
FIGS. 4A-4C illustrate environments in which a mobile platform operates in accordance with one or more embodiments of the disclosure.

At block 302 of FIG. 3, a logic circuit may control gimbal system 122a of mobile platform 110 to selectively direct variable navigation imaging system 140a to a first fixation point 402 in an environment 400A, as shown in FIG. 4. Fixation point 402 may be located at a distance 404 away from the mobile platform 110 and on a surface in the environment 400A such as a wall, building, tree, mountain, or other static structure/object. In some embodiments, a fixation point will be selected in the direction of flight of mobile platform 110, at the end of a flight corridor, which may allow the fixation point to be tracked by the logic circuit for as long as needed while mobile platform 110 moves along the flight corridor. For example, the direction of flight in FIG. 4A may be in the y-direction and fixation point 402 may be at a position in the flight corridor. In some cases where there are less than optimal visual references available in the direction of flight (e.g., clear blue skies), the logic circuit may control gimbal system 122a to search for other image regions with better visual references available, for example, on the ground below in the direction of flight. By selecting a fixation point at the end of the flight corridor, the logic circuit can use the variable navigation imaging system 140a for collision avoidance while flying toward the fixation point. For example, the logic circuit may be able to determine that there are no obstacles in the flight path from the mobile platform 110 to the fixation point 402.

Various fixation techniques may reduce motion blur in a local image region around the fixation point, and the further away from the fixation point in the image plane, the stronger the motion blur effect may become. Thus, in some embodiments, the logic circuit may downscale the image received from variable navigation imaging system 140a to analyze coarser resolutions further away from fixation point 402. In this way, useful information can still be extracted at the coarser resolution. In some embodiments, this may be referred to as foveal vision. Foveal vision can be realized in the following ways, or by combinations thereof. First, foveal vision can be realized through digital image binning of a standard uniformly sampled image. Second, foveal vision can be realized by designing a camera chip where the pixels enlarge the further away from the center of the image. Third, foveal vision can be realized by designing a camera chip where pixel density decreases the further away from the center of the image. Fourth, foveal vision can be realized by designing a lens that has a high magnification in the center of the image and a low magnification at the edges of the image. One advantage of the first approach for foveal vision is that the rate of subsampling away from the fixation point can be digitally varied dynamically depending on movement speed and lighting conditions, which may be referred to as adaptive digital foveal vision according to some embodiments.

At block 304 of FIG. 3, the logic circuit may control gimbal system 122b of mobile platform 110 to selectively direct variable navigation imaging system 140b to a second fixation point, similar to block 302. For example, as shown in FIG. 4A, the logic circuit may control gimbal system 122b to direct variable navigation imaging system 140b to a fixation point 406 in the environment 400A. The second fixation point 406 may be located at a distance 408 away from the mobile platform 110 where the distance 408 is greater than the distance 404. In some cases, distance 408 may be a predefined magnitude greater than distance 404. When mobile platform 110 is moving in a flight path along the y-direction as shown in FIG. 4A, the first fixation point 402 can be used as a first reference point, and as mobile platform 110 approaches the first fixation point 402, the second fixation point 406 can be used as a second reference point to further navigate the mobile platform 110 along the flight path.

At block 306 of FIG. 3, the logic circuit may navigate the mobile platform 110 based on image data received from variable navigation imaging system 140a and variable navigation imaging system 140b. By using gimbal systems 122a and 122b to direct variable navigation imaging systems 140a and 140b to fixation points, the image region around the fixation points should have no optical flow and should not suffer from motion blur under aggressive maneuvers by the mobile platform 110 in low-light conditions. Thus, the logic circuit can perform the aggressive maneuvers more safely as there will be no or minimal vision sensor blindness.

At block 308 of FIG. 3, the logic circuit may further control and navigate the mobile platform. For example, referring again to FIG. 4A, the logic circuit may control gimbal system 122a to direct variable navigation imaging system 140a to a third fixation point 410 in the environment 400A where the fixation point 410 aligns with the flight path of the mobile platform 110 in the y-direction and is farther away than the second fixation point 406 relative to the mobile platform 110. Variable navigation imaging system 140a may be directed to the third fixation point 410 as the mobile platform moves along the flight path toward the first fixation point 402. For example, variable navigation imaging system 140a may saccade from the first fixation point 402 to the third fixation point 410 when mobile platform 110 enters a certain threshold proximity to the first fixation point 402. Thus, in one embodiment, mobile platform 110 can be navigated using variable navigation imaging systems 140a and 140b in a leap-frog manner where variable navigation system 140a fixates on a first point some short distance ahead, variable navigation imaging system 140b fixates on a second point (e.g., twice as far away), and when mobile platform 110 approaches the first point, the variable navigation imaging system 140a can saccade ahead to a third fixation point beyond the second point, and so on and so forth as mobile platform 110 moves along a flight path. This pattern has an advantage of almost always having two distinct fixation points which can improve navigation performance in static environments. Also, in various embodiments where the variable navigation imaging systems 140a and 140b are directed one at a time, there should be no periods of complete blindness (e.g., periods where neither variable navigation imaging system is able to provide useable image data to help navigate mobile platform 110).

In another embodiment, the logic circuit may control gimbal system 122b to saccade variable navigation imaging system 140b between a plurality of fixation points in an environment while gimbal system 122a directs variable navigation imaging system 140a to a fixation point. For example, as shown in the environment 400B of FIG. 4B, variable navigation imaging system 140a may be directed to fixation point 418 at the end of a flight corridor for the mobile platform 110 to maintain a steady course while the second gimbal system 122b is used to repeatedly saccade and fixate variable navigation imaging system 140b on a plurality of fixation points (e.g., fixation points 419 and 420). The logic circuit may receive image data from variable navigation imaging system 140*b* to search the surroundings for new flight corridors, possible threats or obstacles, possible targets to track, or another visually determined objective. In some embodiments, the logic circuit may use the image data from variable navigation imaging system 140*b* as it searches to determine new fixation points for changing a direction of mobile platform 110. In some embodiments, the image data received from variable navigation imaging system 140*b* may be relayed to base station 130 for an operator to view available fixation points and select fixation points to provide back to the logic circuit in instructions for navigating mobile platform 110.

In some embodiments, when variable navigation imaging system 140*b* saccades between a plurality of fixation points, if the distances of the saccades are small enough (e.g., less than a threshold rotational distance), the gimbal system's 122*b* actuators are implemented to be sufficiently fast, and the inter-frame interval of images captured by variable navigation imaging system 140*b* is long enough (typically under good lighting conditions), saccade blindness can be eliminated or reduced by timing the saccade with the inter-frame interval.

Referring again to FIG. 4B, in some cases where variable navigation imaging system 140*b* is searching for new flight corridors, variable navigation imaging system 140*a* can be fixated on fixation point 418 that aligns with a current direction of navigation (y-direction shown in FIG. 4B). Based on image data received from variable navigation imaging system 140*b* during its searching, the logic circuit can control gimbal system 122*b* to direct variable navigation imaging system 140*b* to fixation point 420 that aligns with a determined next direction of navigation. The logic circuit may steer mobile platform 110 from the current direction to the next direction. Gimbal system 122*b* may direct variable navigation imaging system 140*b* to fixation point 420 at an inter-frame interval such that there is no vision sensor blindness when changing directions from the current direction to the next direction. Selecting the next fixation point, such as when changing directions, may be based on several factors including the motion of mobile platform 110, geometry and texture of the surroundings in an environment, locations of possible moving obstacles, objects, or targets, and the task mobile platform is trying to solve. In implementations, trade-offs vary in different tasks such as passive motion tracking tasks, an exploration task, a search for a specific object, or following a specific target. In some embodiments, executing a neural network on a low-resolution 360-degree peripheral image provided by fixed imaging systems 128 may be used to select fixation points. In other implementations where a virtual/augmented reality headset is used to operate mobile platform 110, additional cameras in the headset that watch the eye-movements of a pilot may be used to select fixation points.

Figure 4B:
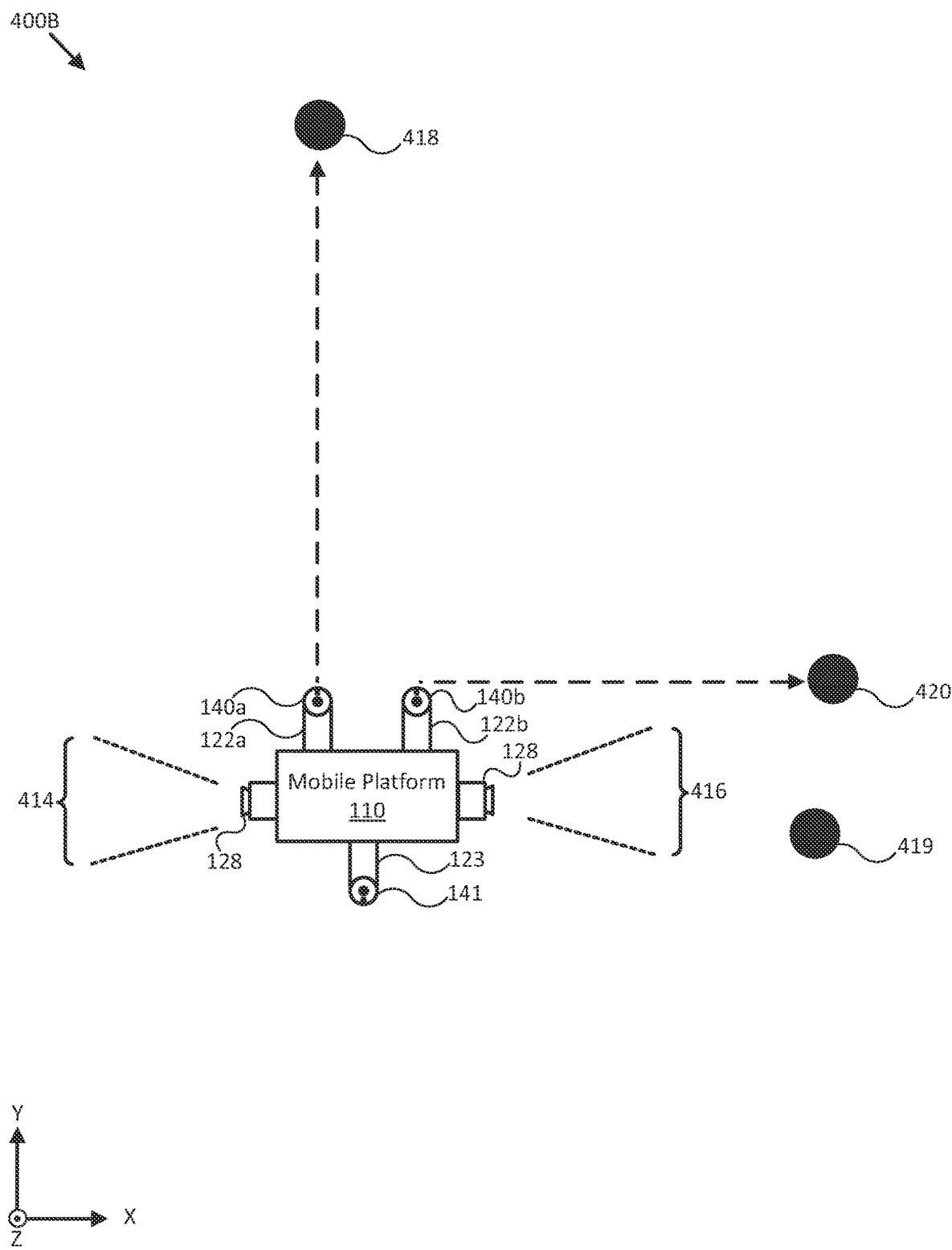
Figure 4C:
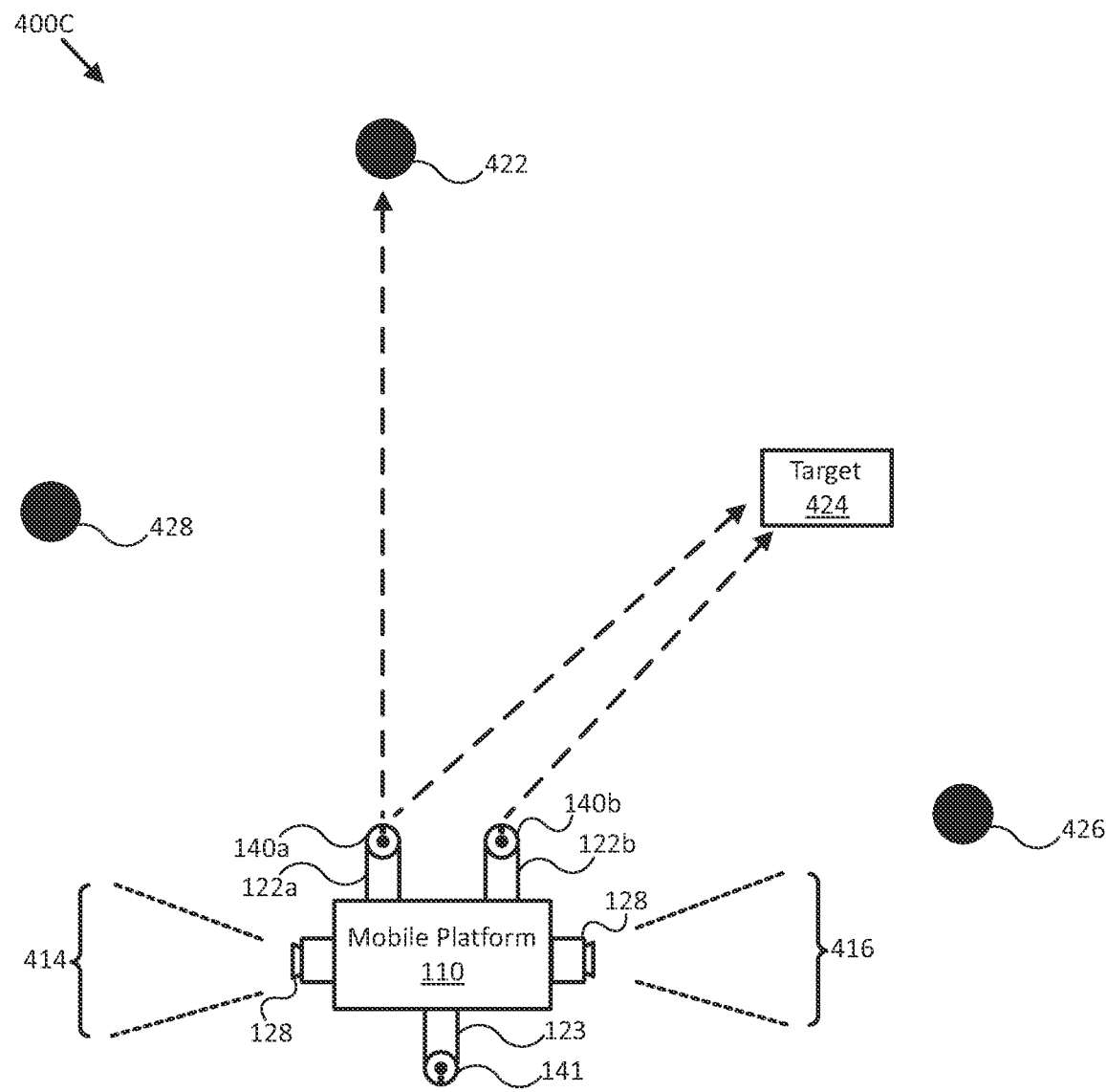

Referring to FIG. 4C, the logic circuit may control gimbal system 122*b* to saccade variable navigation imaging system 140*a* between tracking a target 424 in an environment 400C and a fixation point 422 along a flight path of the mobile platform 110. At some instances, the variable navigation imaging system 140*a* and 140*b* may both be fixated on the target 424. For example, when flying beside moving target 424 and to avoid obstacles 426 and 428, variable navigation imaging system 140*a* can repeatedly saccade between monitoring the flight corridor by fixating on point 422 and stereo fixating the moving target 424 concurrently with variable navigation imaging system 140*b*. When both variable navigation imaging systems 140*a* and 140*b* are fixated on target 424, the logic circuit may generate a stereo vision output of target 424 based on images captured of target 424 and received from variable navigation imaging systems 140*a* and 140*b*. When moving in a static environment where there are no moving obstacles, one variable navigation imaging system may be sufficient for collision avoidance and three-dimensional mapping using structure from motion. However, in a dynamic environment such as environment 400C having moving obstacles, stereo vision is convenient to resolve visual ambiguities of the changes in visual appearance caused by image sensor motion or obstacle motion. For example, target 424 may be a moving person, a manned-vehicle, or another mobile platform such as a UAV. In such cases, it may be helpful to fixate both variable navigation imaging systems 140*a* and 140*b* on the moving target 424 to accurately estimate the moving target's position relative to mobile platform 110 using stereo fixation.

If the target's 424 motion relative to the environment 400C is sufficiently large, a conflict may arise between fixating on the target 424 and fixating on the environment 400C and possible obstacles (e.g., obstacles 426 and 428). This may be solved by fixation-release, where one or both variable navigation imaging systems 140*a* and 140*b* release their fixation on moving target 424 to instead fixate on the background in environment 400C for navigation purposes before being directed back to the moving target 424 for another short period of time before releasing and repeating. A leap-frog approach can also be used in which one of the variable navigation imaging systems is always fixated on the moving target 424 and they alternate between fixating on the target 424 and fixating on a point in the flight path to assist in navigation of mobile platform 110. In some embodiments, a plurality of different fixation points can be used to track a plurality of moving targets in an environment. Depending on application, mobile platform 110 may slow down in motion to accommodate additional fixation points for additional moving targets.

As shown in FIGS. 4A-4C, mobile platform 110 may have fixed imaging systems 128 that can be used for further operation and navigation of the mobile platform 110. For example, fixed imaging systems 128 may be body-fixed to the mobile platform 110 and capable of providing images of peripheral fields of view 414 and 416, which may be peripheral with respect to the fields of view of variable navigation imaging systems 140*a* and 140*b*. For example, in FIG. 4C, when variable navigation imaging systems 140*a* and 140*b* are fixated on target 424, the logic circuit may be able to navigate the mobile platform 110 based on images received from the fixed imaging systems 128. In some embodiments, fixed imaging systems 128 may capture images of their fields of view 414 and 416 (e.g., peripheral fields of view) at a frame rate that correlates to an optical flow of a scene (in field of view) captured by an imaging sensor of the fixed imaging system to reduce power consumption of the mobile platform 110. For example, the optical flow may be the pattern of apparent motion of objects, surfaces, and edges in a visual scene caused by the relative motion between the mobile platform 110 and the scene. In some cases, images captured by fixed imaging systems 128 may be used for additional collision avoidance (e.g., to detect and evade collision with obstacles 426 and 428) as peripheral fields of view 414 and 416 may be able to capture obstacles 426 and 428 in scenarios where variable navigation imaging systems 140*a* and 140*b* do not sense obstacles 426 and 428, such as when variable navigation imaging systems 140*a* and 140*b* are fixated on target 424 to assess whether target 424 is a threat.

As an illustration, in a high-speed pursuit of moving target 424, if target 424 is actively trying to evade mobile platform 110, the logic circuit may perform fixation-release or use multiple fixation points to keep track of the environment 400C to avoid any collisions. In such cases, stereo-fixation may be maintained on target 424 and the logic circuit can rely on peripheral vision provided by fixed imaging systems 128 to avoid collisions. In such cases, the logic circuit may navigate mobile platform in the wake of moving target 424 to further minimize the risk of collision.

In some embodiments, the logic circuit may determine an orientation of gimbal systems 122a and 122b and/or variable navigation imaging systems 140a and 140b with respect to the body of the mobile platform 110 by comparing the images received from fixed imaging systems 128 to images received from variable navigation imaging systems 140a and 140b. For example, the logic circuit may determine visual features from images received from the variable navigation imaging systems 140a and/or 140b and match them to common visual features in the images received from fixed imaging systems 128 to make any adjustments necessary to the orientation of gimbal systems 122a and 122b or variable navigation imaging systems 140a and 140b. In some embodiments, the matching may be performed using low-resolution images from the fixed imaging systems 128 and downscaled versions of the images from the variable navigation imaging systems 140a and 140b.

It will be appreciated that in various embodiments, fixed imaging systems 128 may not be implemented in mobile platform 110. For example, variable navigation imaging systems 140a and 140b can be used to capture forward, downward, rear, and upward view. Left and right stereo views may be achieved by yawing mobile platform 110.

Referring to FIGS. 4A-4C, in some embodiments, the logic circuit may use payload imaging system 141 to capture images of a scene in the environment. The logic circuit may control gimbal system 123 to selectively orient payload imaging system 141 to capture the scene in the environment. For example, the scene may include targets or other objects of interest. In some embodiments, instructions for directing the payload imaging system 141 to capture certain images may be received from the base station 130 of FIG. 1. It will be appreciated that variable navigation imaging systems 140a and 140b may be used primarily for navigation purposes and especially during aggressive maneuvers of mobile platform 110 while payload imaging system 141 may generally be used for surveying an environment and gathering sensor data related to the environment.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A mobile platform comprising:
a propulsion system configured to provide motive force for the mobile platform in navigation about an environment;
first and second variable navigation imaging systems;
first and second gimbal systems configured to selectively orient the first and second variable navigation imaging systems, respectively; and
a logic circuit configured to:
control the first gimbal system to selectively direct the first variable navigation imaging system to a first fixation point in the environment;
control the second gimbal system to:
selectively direct the second variable navigation imaging system to a second fixation point in the environment, and
saccade the second variable navigation imaging system between a plurality of fixation points in the environment while the first gimbal system directs the first variable navigation imaging system to the first fixation point; and
navigate the mobile platform about the environment, via the propulsion system, based on first image data associated with the first fixation point and received from the first variable navigation imaging system and second image data associated with the second fixation point and received from the second variable navigation imaging system.

2. The mobile platform of claim 1, wherein the first fixation point aligns with a flight path of the mobile platform as the mobile platform is navigated about the environment, and wherein the second fixation point aligns with the flight path and is located at a distance farther away than the first fixation point relative to the mobile platform.

3. The mobile platform of claim 2, wherein the logic circuit is configured to:
control the first gimbal system to direct the first variable navigation imaging system to a third fixation point in the environment that aligns with the flight path and is farther away than the second fixation point relative to the mobile platform.

4. The mobile platform of claim 1, wherein saccading the second gimbal system comprises tracking a target in the environment and a fixation point along a flight path of the mobile platform.

5. The mobile platform of claim 1, wherein:
the first fixation point and the second fixation point are fixed on a target; and
the logic circuit is configured to generate a stereo vision output based on images of the target received from the first variable navigation imaging system and the second variable navigation imaging system.

6. The mobile platform of claim 5, further comprising:
a fixed imaging system configured to provide images of a peripherical field of view relative to respective fields of view of the first and second variable navigation imaging systems, wherein the logic circuit is configured to further navigate the mobile platform based on the images of the peripheral field of view provided by the fixed imaging system, wherein the logic circuit is configured to navigate the mobile platform based on images received from the fixed imaging system when the first variable navigation imaging system and the second variable navigation imaging system are directed to the target.

7. The mobile platform of claim 1, further comprising:
a fixed imaging system configured to provide images of a peripherical field of view relative to fields of view of the first variable navigation imaging system and the second variable navigation imaging system, wherein the logic circuit is configured to further navigate the mobile platform based on the images of the peripheral field of view provided by the fixed imaging system.

8. The mobile platform of claim 7, wherein the fixed imaging system is configured to capture the images of the peripheral field of view at a frame rate that correlates to an optical flow of a scene captured by an imaging sensor of the fixed imaging system to reduce power consumption of the mobile platform.

9. The mobile platform of claim 7, wherein the logic circuit is configured to determine an orientation of the first gimbal system or the second gimbal system with respect to a body of the mobile platform by comparing the images received from the fixed imaging system to images received from the first variable navigation imaging system or the second variable navigation imaging system.

10. The mobile platform of claim 1, further comprising:
a payload imaging system configured to capture a scene in the environment; and
a third gimbal system configured to selectively orient the payload imaging system to capture the scene in the environment.

11. A mobile platform comprising:
a propulsion system configured to provide motive force for the mobile platform in navigation about an environment;
first and second variable navigation imaging systems;
first and second gimbal systems configured to selectively orient the first and second variable navigation imaging systems, respectively; and
a logic circuit configured to:
control the first gimbal system to selectively direct the first variable navigation imaging system to a first fixation point in the environment;
control the second gimbal system to selectively direct the second variable navigation imaging system to a second fixation point in the environment; and
navigate the mobile platform about the environment, via the propulsion system, based on first image data associated with the first fixation point and received from the first variable navigation imaging system and second image data associated with the second fixation point and received from the second variable navigation imaging system; wherein the first fixation point aligns with a current direction of navigation and the second fixation point aligns with a next direction of navigation; and
steer the mobile platform from the current direction to the next direction, wherein the second gimbal system directs the second variable navigation imaging system toward the second fixation point at an inter-frame interval such that there is no blindness when changing directions from the current direction to the next direction.

12. The mobile platform of claim 11, wherein the logic circuit is configured to:
control the first gimbal system to direct the first variable navigation imaging system to a third fixation point in the environment that aligns with the flight path and is farther away than the second fixation point relative to the mobile platform.

13. The mobile platform of claim 11, further comprising:
a payload imaging system configured to capture a scene in the environment; and
a third gimbal system configured to selectively orient the payload imaging system to capture the scene in the environment.

14. A method comprising
controlling, by a logic device of a mobile platform, a first gimbal system of the mobile platform to selectively direct a first variable navigation imaging system of the mobile platform to a first fixation point in an environment;
controlling, by the logic device of the mobile platform, a second gimbal system of the mobile platform to selectively direct a second variable navigation imaging system of the mobile platform to a second fixation point in the environment;
controlling, by the logic device, the second gimbal system to saccade the second variable navigation imaging system between a plurality of fixation points in the environment while the first gimbal system directs the first variable navigation imaging system to the first fixation point; and
navigating, by the logic device, the mobile platform about the environment, via a propulsion system of the mobile platform, based on first image data associated with the first fixation point and received from the first variable navigation imaging system and second image data associated with the second fixation point and received from the second variable navigation imaging system.

15. The method of claim 14, wherein the first fixation point aligns with a flight path of the mobile platform as the mobile platform is navigated about the environment, and wherein the second fixation point aligns with the flight path and is located at a distance farther away than the first fixation point relative to the mobile platform.

16. The method of claim 15, further comprising:
controlling, by the logic device, the first gimbal system to direct the first variable navigation imaging system to a third fixation point in the environment that aligns with the flight path and is farther away than the second fixation point relative to the mobile platform.

17. The method of claim 14, further comprising:
generating, by the logic device, a stereo vision output based on images of a target received from the first variable navigation imaging system and the second variable navigation imaging system, wherein the first fixation point and the second fixation point are fixed on the target.

18. The method of claim 14, wherein saccading the second variable navigation imaging system comprises tracking a target in the environment and a fixation point along a flight path of the mobile platform.

19. The method of claim 14, further comprising:
navigating, by the logic device and via the propulsion system, the mobile platform based on images of a peripheral field of view provided by a fixed imaging system having a fixed position and orientation relative to the mobile platform.

20. The method of claim 19, further comprising capturing the images of the peripheral field of view at a frame rate that correlates to an optical flow of a scene captured by an imaging sensor of the fixed imaging system to reduce power consumption of the mobile platform.

\* \* \* \* \*